United States Patent [19]

Nakamura et al.

[11] Patent Number: 4,783,806

[45] Date of Patent: Nov. 8, 1988

[54] SPEECH RECOGNITION APPARATUS

[75] Inventors: Kazuo Nakamura, Kariya; Tadao Norjiri, Oobu, both of Japan

[73] Assignee: Nippondenso Co., Ltd., Kariya, Japan

[21] Appl. No.: 6,061

[22] Filed: Jan. 22, 1987

[30] Foreign Application Priority Data

Jan. 22, 1986 [JP] Japan .................................. 61-9983

[51] Int. Cl.$^4$ .............................................. G10L 5/00
[52] U.S. Cl. ........................................ 381/43; 381/41; 364/513; 364/513.5
[58] Field of Search ............................ 381/41, 42, 43; 364/513, 513.5

[56] References Cited

U.S. PATENT DOCUMENTS

| | | | |
|---|---|---|---|
| 4,059,725 | 11/1977 | Sakoe | 381/43 |
| 4,282,403 | 8/1981 | Sakoe | 381/43 |
| 4,319,085 | 3/1982 | Welch et al. | 381/43 |
| 4,394,538 | 7/1983 | Warren et al. | 381/43 |
| 4,400,788 | 8/1983 | Myers et al. | 364/513 |
| 4,516,215 | 5/1985 | Hakaridani | 364/513.5 |
| 4,530,110 | 7/1985 | Nojiri et al. | 381/43 |
| 4,667,341 | 5/1987 | Watari | 381/43 |

Primary Examiner—William M. Shoop, Jr.
Assistant Examiner—Brian K. Young
Attorney, Agent, or Firm—Cushman, Darby & Cushman

[57] ABSTRACT

A partial pattern $A_{(p,q)}$ between time points "i" and "q" on the time base of an input pattern is obtained by a partial pattern forming section, on the basis of an input speech as detected by a speech detection section. A reference pattern memory section stores the reference pattern $B^n$ for every word number "n", which are previously set for every "n". A normalizing function, which depends on the time duration $q-p+1$ of the partial pattern as obtained by said partial pattern forming section and the time duration $J_n$ of the reference pattern as stored in the reference pattern memory section, provides a normalized similarity measure. The normalized similarity thus obtained is maximized by the dynamic programming algorithm in a partial maximum similarity computing section. The maximum value of the maximized result for "n" is obtained as a partial maximum similarity measure $D_q$. In a similarity decision section, a registered word "n" providing the similarity measure $D_q$ is treated as a partial decision result $W_q$, to obtain the partial maximum similarity measure $D_i$ and the partial decision result $W_i$ at every time point along the time series of the input pattern. In a recognition output section, the largest maximum similarity measure of those measures $D_i$ is treated as the maximum similarity measure $D_{max}$, to obtain the partial decision result $W_i$ providing the $D_i$. The decision result is output as the speech recognition result.

5 Claims, 5 Drawing Sheets

SPEECH RECOGNITION APPARATUS

BACKGROUND OF THE INVENTION

This invention relates to a speech recognition apparatus, and more particularly to a speech recognition apparatus capable of, in an environment where much noise is present, clearly recognizing the speech of a talker, distinguishing it from the noise.

In the speech recognition means that have been put into practical use, pattern matching is performed by comparing an input pattern of the utterance of a talker with the reference patterns of registered words. When the input pattern matches a reference pattern, it is recognized as the registered word.

The pattern matching thus far used will be outlined.

If a parameter representing the feature of voice at time point "i" is designated by vector $a_i$, the input pattern A is expressed by the time series of the feature vectors:

$$A = (a_1, a_2, \ldots, a_i, \ldots, a_I) \qquad (1)$$

where I is a parameter for the time duration of input speech pattern A.

Supposing that the reference pattern of word "n" as previously registered is "$B^n$" ($n = 1 \ldots N$), the reference pattern of registered word "n" is made up of feature vectors of $J_n$ each of which is similar to the feature vector $a_i$ of the input pattern, and is mathematically expressed:

$$B^n = (b_1^n, b_2^n, \ldots, b_j^n, \ldots, b_{J^n}^n) \qquad (2)$$

In general, time duration I of input pattern A is not necessarily be equal to time duration $J_n$ of reference pattern $B^n$. For this reason, for the actual matching, a function $j(i)$ is first formed, which optimumly approximates the time base "i" of the input pattern and the time base "j" of the reference pattern. Then, a maximum value $S(A, B^n)$ of the sum of the vector similarity measures $s(a_i, b_j^n(i))$ as defined by the time bases i and j(i) is computed for each "n". As a result, it is judged that the reference pattern providing the maximum value corresponds to the registered word with the highest similarity measure for the input pattern A. Then, it is selected as a recognized word.

There are cases that noise is present continuous to the top and end of the meaning voice or the sound irrelative to the meaning voice, such as a lisp of a talker, is input before and after the utterance. In such cases, it is impossible to have a high speech recognition performance by a simple pattern matching process, which is based on the reference pattern $B_n$ and the input pattern A.

To cope with this problem, there is known, for example, "Speech Recognition Apparatus", disclosed in Japanese Patent Disclosure No. S58-181099. In this speech recognition apparatus, a correlation between the input speech signals from two speech input means is worked out, to distinguish the understandable voice from the noise contained in the input voice. The result gives the understandable input voice.

However, this recognition means requires two speech input means. Further, this means is designed on the basis of the fact that the noise is equally input from the two speech input means. The local noise, for example, is not allowed for. Therefore, this means is not only complicated in instruction but also still involves the following problem for the improvement of the speech recognition performance.

In an environment where noise is contained in the input speech, it is essentially difficult to completely separate the voice from noise, and to extract only the voice. Therefore, an error which is caused at the time of distinguishing the meaning voice and the noise occurring at the extraction stage, possibly causes the recognition error.

The difficulty of speech recognition in the noisy environment will be described further in detail.

Suppose that the input pattern containing noise is given by the expression (1) above. Of the input pattern, the partial pattern corresponding to the understandable voice is expressed as the partial pattern with the starting point of time point i = 1 and endpoint of time point i = m, and is mathematically expressed by $$A_{(l, m)} = (a_l, a_{l+1}, \ldots, a_i, \ldots, a_m) \qquad (3)$$

$(1 = \leq l < m \leq I)$

Figure 8A:
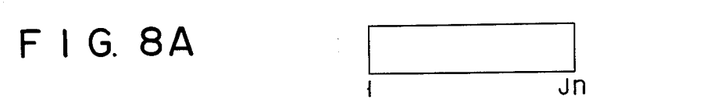
FIGS. 8A through 8C show input speech patterns for explaining the speech recognition operation of a conventional speech recognition means in the noisy environment.
Figure 8B:
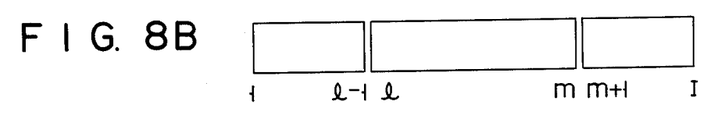

The input pattern A as shown in FIG. 8B includes the partial patterns composed of only noise, which are mathematically expressed:

$$A_{(1, l-1)} = a_1, a_2, \ldots, a_{l-1} \qquad (4)$$

$$A_{(m+1, I)} = a_{m+1}, a_{m+2}, \ldots, a_I \qquad (5)$$

The input pattern A with noise is expressed:

$$A = A(1, l-1) \oplus A(l, m) \oplus A(m+1, I) \qquad (6)$$

The operator $\oplus$ means merely to arrange the feature vectors of each partial pattern time sequentially. Therefore, the input pattern expressed by expression (5) is similar to that of expression (1).

To obtain a similarity measure between the input pattern A and the reference pattern $B^n$ shown in FIG. 8A computed by the conventional pattern matching, the pattern, which contains the partial patterns $A_{(1, l-1)}$ and $A_{(m+1, I)}$ composed of only noise contained in the input pattern, and is different from the reference pattern, is used for the pattern matching. Therefore, the similarity measure obtained is essentially small.

Figure 8C:
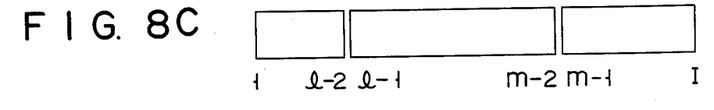

If the improvement is made as in Japanese Patent Disclosure No. 58-181099, it is impossible to exactly separate the partial pattern $A_{(l, m)}$ corresponding to the understandable voice. Therefore, it can only be separated as indicated by a partial pattern shown in FIG. 8C and expressed by:

$$A_{(l-2, m-2)} = (a_{l-2}, a_{l-1}, \ldots, a_{m-3}, a_{m-2}) \qquad (7)$$

The partial pattern $A_{(l-2, m-2)}$ of the input pattern separated as shown in the relation (7) does not contain most of the partial patterns $A_{(1, l-1)}$ and $A_{(m+1, I)}$ composed of only noise. The partial pattern $A_{(l-2, m-2)}$, which is subjected to the matching with the reference pattern $B^n$, still contains a part $A_{(l-2, l-1)}$ of the only noise contained partial pattern. Further, the partial pattern A does not contain a part $A_{(m-2, m)}$ of the partial pattern corresponding to the voice. Therefore, even if that improvement is made, it is impossible to obtain an optimum matching, and the lowering of the similarity measure is unavoidable. Such lowering of the similarity measure does not have advantageous effects on the result of the pattern matching with each "n" of the reference pattern $B_n$. Therefore, a possibility of occurrence of the erroneous recognition is increased, hindering the improvement of the speech recognition performances.

SUMMARY OF THE INVENTION

An object of this invention is to provide a speech recognition apparatus which can reliably recognize the reference pattern optimumly matching a partial pattern corresponding to a noise contained input voice in a noisy environment, thereby realizing a stable speech recognition.

Another object of this invention is to provide a speech recognition apparatus which can actively avoid the separation of noise from the understandable voice, to minimize an error which may occur at the time of separating the voice, and hence to improve the speech recognition performance.

In a speech recognition apparatus according to the present invention, the matching of the reference pattern $B_n$ of a word previously registered with an entire input pattern A containing noise is executed for all the pattern segments each of which has a starting point which may exit at any time point on the input pattern A and an endpoint which may exit at any time point after the starting point. At this time, a maximum similarity $D_i$ is obtained which is the largest similarity measure $D_{max}$ of those measures of each "n" reference pattern $B_n$ at each end point. A registered word is determined for recognition, which corresponds to the reference pattern whose similarity measure against the input pattern $A_{(p, q)}$ in the pattern segment corresponding to the understandable voice is at the maximum. A dynamic programming algorithm is employed for maximizing the similarity measure in the pattern segment for the meaning voice.

The speech recognition apparatus thus arranged has the following effects. There is no need for separating the partial pattern A(l, m) for the meaning voice from the input pattern containing noise. With this feature, any special design is not needed for the voice input section.

A weighting process, which is based on the time duration "t=q−p+1" of the partial pattern A(p, q) of the input pattern to be subjected to the matching and the time duration $J_n$ of the reference pattern $B_n$, is applied to the similarity measures as the results of the matching. Therefore, the high similarity measures, which locally exit dependent on the time duration of the partial pattern A(p, q) of the input pattern and the reference pattern $B^n$, can be eliminated. It is possible to stably recognize the reference pattern $B^n$ optimumly approximating the partial pattern A(l, m) for the meaning voice contained in the input pattern A also containing noise.

The present invention enables the meaning voice to stably be recognized in noisy environment by the inventive improvement of the recognition algorithm. Therefore, any specially designed hardware is not required.

DETAILED DESCRIPTION OF THE PREFERRED EMBODIMENTS

It is assumed now that the noise contained input pattern A is given by the relation (6):

$$\begin{aligned} A &= A_{(1, l-1)} \oplus A_{(l, m)} \oplus A_{(m+1, I)} \\ &= (a_1, a_2, \ldots, a_{l-1}) \oplus (a_l, a_{l+1}, \ldots, a_i, \\ &\quad \ldots, a_m) \oplus (a_{(m+1)}, a_{(m+2)}, \ldots, a_I) \\ &= (a_1, a_2, \ldots, a_i, \ldots, a_I), \end{aligned} \quad (8)$$

and that the reference pattern for each "n" of the registered word is given as by the relation (2). The partial pattern of the input pattern A, which is expressed by:

$$A_{(l, m)} = (a_l, a_{l+1}, \ldots, a_i, \ldots, a_m), \quad (9)$$

corresponds to the meaningful utterance voice. Any portion $A_{(p, q)}$ of the input pattern is given by:

$$A_{(p, q)} = a_p, a_{p+1}, \ldots, a_i, \ldots, a_q) \quad (10)$$

$(1 \leq p < q \leq I)$

In this invention, the matching process is applied between the reference pattern $B_n$ for each "n" of a previously registered word "n", and the partial pattern $A_{(p, q)}$ of the input pattern containing noise as given by the relation (10), to determine "n" providing a maximum matching. On the basis of the determination, the partial pattern $A_{(l, m)}$ corresponding to the meaning voice of the input pattern A is judged to correspond to the registered word "n".

In other words, to recognize the meaning voice in the noisy environment, a registered word is decided whose reference pattern optimumy approximating the partial pattern $A_{(l, m)}$ corresponding to meaning voice of the noise contained input pattern A.

Figure 1:
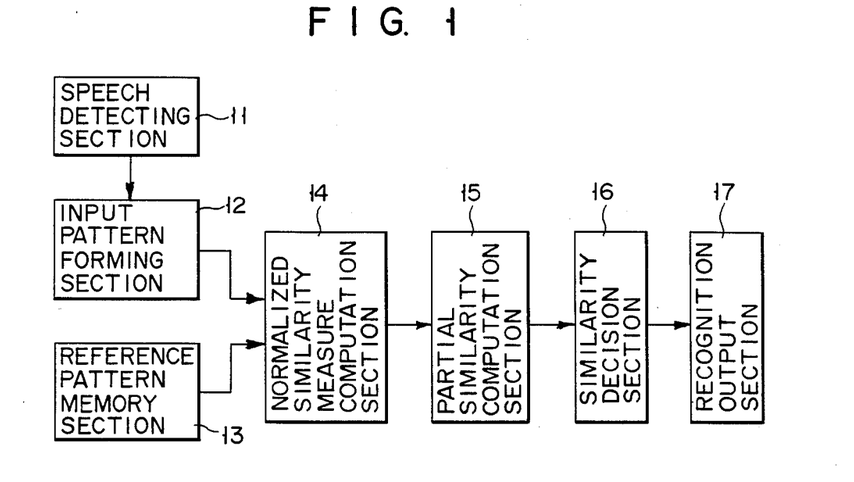
FIG. 1 is a block diagram illustrating a configuration of a speech recognition apparatus according to an embodiment of the present invention.

In FIG. 1 illustrating a scheme of a speech recognition apparatus according to the present invention, the recognition apparatus is provided with speech detecting section 11 for detecting an input speech to be recognized. The input speech signal detected by speech detecting section 11 is input to input partial pattern forming section 12.

The partial pattern forming section 12 is for obtaining a partial pattern $A_{(p, q)} = a_p, a_{p+1}, \ldots, a_q$ between time points "i" and "q" on the time base of the input pattern expressed in terms of feature vector time series.

Reference pattern memory 13 is provided correspondingly to partial pattern forming section 12. Reference pattern memory section 13 stores reference pattern $B_n$ for each word number "n" of previously stored pattern "$B^n = b_1^n, b_2^n, b_j^n, b_{J_n}^n$" for the word number "n".

By the use of the normalized function on the basis of the time duration "q−p+1" of the partial pattern computed by partial pattern forming section 12 and the time duration $J_n$ stored in reference pattern memory section 13, a normalized similarity measure is computed by normalized similarity measure section 14.

The normalized similarity measure computed by normalized similarity measure section 14 is maximized by partial maximum similarity computation section 15 by the use of the dynamic programming (DP) algorithm. Computation section 15 computes the maximum value for the "n" of the maximized results as a partial maximum similarity measure $D_q$, and outputs it.

Similarity measure decision section 16 performs an operation in which registered word "n" that gives the similarity measure $D_q$ is decided to be partial decision result $W_q$. This operation finds out partial maximum similarity measure $D_i$, and partial decision result $W_i$ at all the possible time points in the time series of the input pattern.

Recognition section 17 selects the largest similarity measure of these maximum similarity measures $D_i$, as the maximum similarity measure $D_{max}$ and finds partial decision result $W_i$ that gives the selected similarity measure. Recognition section 17 outputs the decision result as a speech recognition result.

Supposing that the time point "i=q" on the time base of an input pattern is the endpoint "i=m" of the partial pattern $A_{(l, m)}$ corresponding the understandable voice, the partial pattern with the starting point of "i=p" of time point "i=q" is expressed:

$$A_{(p, q)} = (a_p, a_{p+1}, \ldots, a_i, \ldots, a_q) \quad (11)$$

$(1 \leq p < q \leq I)$

Therefore, a similarity measure between the above partial pattern $A_{(p, q)}$ and reference pattern $B^n$ can be obtained by the sum of similarity measures between vectors $s\{a_i, b_j^n(i)\}$ is given by:

$$S\{A_{(p, q)}, B^n\} = \sum_{i=p}^{q} s(a_i, b_{j(i)}^n) \quad (12)$$

Let the maximized $S\{A_{(p, q)}, B^n\}$ for time point "p" be partial similarity measure $S_q^n$. Then $S_q^n$ is expressed:

$$S_q^n = \max_p S\{A_{(p, q)}, B^n\}, \quad (13)$$

Let the maximized $S_q^n$ for "n" be partial maximum similarity measure $D_q$. Then we have:

$$\begin{aligned} D_q &= \max_n \{S_q^n\} \\ &= \max_n \left[ \max_p S\{A_{(p, q)}, B^n\} \right] \\ &= \max_{p,n} [S\{A_{(p, q)}, B^n\}] \end{aligned} \quad (14)$$

Partial maximum similarity measure $D_q$ is used for determining registered word $W_q$ that gives reference pattern $B^n$ optimumly approximating partial pattern $A_{(l, m)}$ which corresponds to the meaning voice when it is assumed that the time point "i=q" is the endpoint of the partial pattern.

If the operation for computing partial maximum similarity measure $D_i$ and partial decision result $W_i$ at time point of "i=i" of the input pattern, is successively executed, while changing the time point "i" in the rage of 1 to I, partial maximum similarity measure $D_i$ and partial decision result $W_i$ at each time point "i" ($1 \leq i \leq I$) of the input pattern can be obtained.

Next, when the maximum similarity measure of those partial similarity measures $D_i$:

$$D_{max} = {}_i^{max}\{D_i\} \quad (15)$$

is found, partial decision result $W_i$ providing the maximum similarity measure $D_{max}$ is selected as the recognized word. In this way, understandable voice can be recognized in the noisy environment.

The present invention has been described in detail. In deciding partial similarity measure $S_q^n$ for each "n" of the reference patterns prior to the determination of the above partial maximum similarity measure $D_q$, the sum $S(A_{(p, q)}, B^n)$ of the vector similarity measures given by expression (12) cannot be simply compared with one another in magnitude.

For example, assume that for the similarity measure $s(a_i, b_j^n)$ between feature vectors $a_i$ and $b_j^n$, the inner product of $a_i$ and $b_j n$ is used as the measure, and expressed as:

$$s(a_i, b_j^n) = a_i \times b_j^n, \quad (16)$$

In reality, time base "i" of an input pattern and time base "j" of the reference pattern do not correspond in one-to-one relation. A function j(i), which makes these time bases "i" and "j" optimumly correspond to each other, must be set up. Then, a similarity measure:

$$s\{a_i, b_{j(i)}^n\} = a_i \times b_j^n(i) \quad (17)$$

defined by "i" and j(i), is used. At this time, a similarity measure between input pattern A and reference pattern $B^n$:

$$S\{A_{(p, q)}, B^n\} = \sum_{i=p}^{q} \{a_i, b_{j(i)}^n\} \quad (18)$$

expressed as the sum of similarity measures between vectors as given by relation (17) is apt to take a larger value as the time duration.

$$t_{pq} = q - p + 1 \quad (19)$$

becomes longer, and as time duration $J_n$ becomes longer. This causes the similarity measure to apparently be larger.

If, for the measure of the vector similarity measure, a quantity, for example, distance, which is smaller as the similarity between $a_i$ and $b_j^n(i)$ becomes high, similarity measure $S\{A_{(p, q)}, B_n\}$ which is given as the sum of the vector similarity measure $s\{a_i, b_j^n(i)\}$, is apt to have a small value as time length $t_{pq}$ of input pattern $A_{(p, q)}$ becomes short, and as time length $J_n$ of the reference pattern becomes short. This causes the similarity measure to be seemingly higher.

Accordingly, there is a possibility that the result of matching of partial pattern $A_{(p, q)}$ with reference pattern $B^n$, i.e., similarity measure $S\{A_{(p, q)}, B^n\}$, are locally high.

For the above reason, to maximize the sum $S\{A_{(p,q)}, B^n\}$ of the vector similarity measures for "p" as given by the equation (12), the similarity measure sum $\{A_{(p,q)}, B^n\}$ must be converted into the quantity, which is not dependent on the time duration "q-p+1" of the partial pattern as subjected to the matching and the time duration $J_n$ of the reference pattern. Assuming now that the function to effect such conversion is given by $r[q-p+1, J_n, S\{A_{(p,q)}, B^n\}]$, a normalized similarity measure as defined by that function is given:

$$R\{A_{(p,q)}, B^n\} = r[q-p+1, J_n, S\{A_{(p-q)}, B^n\}] \quad (20)$$

Such an function may be obtained in the form of an average similarity measure for each unit of time duration, as given by:

$$r[q - p + 1, J_n, S\{A_{(p,q)}, B^n\}] = \frac{S\{A_{(p,q)}, B^n\}}{q - p + 1 + J_n} \quad (21)$$

It may be obtained as an average similarity measure for each unit of pass length, as given by equation (22)

$$r[q - p + 1, J_n, S\{A_{(p,q)}, B^n\}] = \frac{S\{A_{(p,q)}, B^n\}}{p^{ass}} \quad (22)$$

where $p^{ass}$ = matching path length. Additionally, it may be obtained by equation (23):

$$r[q - p + 1, J_n, S\{A_{(p,q)}, B^n\}] = \frac{S\{A_{(p,q)}, B^n\}}{\{\alpha \cdot J_n + \beta \cdot (q - p + 1)\}^\gamma} \quad (23)$$

where $\alpha$, $\beta$, and $\gamma$ are constants

This expression is used for making more strict the weighting for the time duration "q−p+1" of the matching subjected partial pattern in the equation (21) and the time duration $J_n$ of the reference pattern. It is noted that the above expressions are some specific examples for normalizing the similarity measure, and other suitable functions may be used for the same purposes.

The similarity measure $R\{A_{(p,q)}, B^n\}$ as normalized by the function $r[q-p+1, J_n, S\{A_{(p,q)}, B^n\}]$ having the above nature, can be used for the oomparing process of their magnitudes. The partial similarity measure as given by the equation (12) can be rewritten into:

$$S_q^n = {}_p^{max}[R\{A_{(p,q)}, B^n\}] \quad (24)$$

Therefore, the maximum partial similarity measure is:

$$D_q = {}_n^{max}\{S_q^n\} \quad (25)$$

The partial decison result $W_q$ can be treated as the registered word $n_q$ which provides the $D_q$ of equation (25). The similarity measures between the partial patterns of the input pattern and the reference patterns, which are locally high, and the removal of the locally high similarity measures, will be described in detail. In the description, the distance is used for the measure for the similarity measure, and the equation (23) is used for the normalizing function.

Let us consider a case that [kyoto] is the registered word of n=1, and and [tokyoto], the registered word of n=2. It is assumed that an ideal reference pattern $B^1$ of the registered word n=1 for [kyoto] is expressed by:

$$B^1 = b_1^1, b_2^1, \ldots, b_j^1, \ldots, b_{J1}^1 \quad (26)$$

As for the ideal reference pattern $B^2$ of the registered word n=2, if the partial pattern for [to] is expressed by:

$$B^{2'} = b_1^2, b_2^2, \ldots, b_t^2 \quad (27)$$

the pattern $B^2$ is:

$$B^2 = B^{2'} \oplus B^1 \quad (28)$$
$$= b_1^2, b_2^2, \ldots, b_t^2, b_1^1, b_2^1, \ldots, b_{J1}^1$$

The ideal reference patterns used here is for simplifying the explanation, and the description to follow is not particular to this instance.

If the "tokyoto" is pronounced in the noisy environment, the input pattern is mathematically expressed by:

$$A = A_{(1,l-1)} \oplus A_{(l,k-1)} \oplus A_{(k,m)} \beta A_{(m+1,I)} \quad (29)$$

where I designates a time duration of the input pattern, $A_{(1,l-1)}$, and $A_{(m+1,I)}$ the partial patterns containing only noise, $A_{(l,k-1)}$ a partial pattern corresponding to "to" in the pronounced word, and $A_{(k,m)}$ a partial pattern corresponding to "kyoto". Accordingly, a partial pattern corresponding to the understandable voice is:

$$A_{(l,m)} = A_{(l,k-1)} \oplus A_{(k,m)} \quad (30)$$

where $(1 \leq l < k < m \leq I)$

A similarity measure between a partial pattern $A_{(k,m)}$ of the input pattern in which the starting point is time point "i=m", and the endpoint, time point "i=k", and the reference pattern $B^1$ of the registered word of n=1, is:

$$S\{A_{(k,m)}, B^1\} = \sum_{i=k}^{m} s\{a_i, b_{j(i)}^1\} \quad (31)$$

A similarity measure between the voice with the starting point of "i=l" and the endpoint of "i=m", and the reference pattern $B^2$ of the registered word n=2 if it is actually pronounced, is given by:

$$S\{A_{(l,m)}, B^2\} = \sum_{i=l}^{m} s\{a_i, b_{j(i)}^2\} \quad (32)$$

Bear in mind that from the equation (30), $B^2 = B^{2'} \oplus B^1$ and the similarity measure is expressed by the sum of the vector similarity measures. Then, we have:

$$S\{A_{(l,m)}, B^2\} = S\{A_{(l,k-1)} \oplus A_{(k,m)}, B^{2'} \oplus B^1\} \quad (33)$$
$$= S\{A_{(l,k-1)}, B^{2'}\} + S\{A_{(k,m)}, B^1\}$$

The partial maximum similarity measure of the input pattern at time point "i=m" is given by:

$$D_m = S\{A_{(k,m)}, B^1\} \quad (34)$$

The partial decision result is $W_m = 1$.

Thus, if the magnitudes of the similarity measures as the results of pttern matching are simply compared, a similarity measure of the reference pattern $B^1$ which is incidentally similar to a local pattern $A_{(k,m)}$ of the partial pattern $A_{(l,m)}$ corresponding to the meaning voice in the input pattern, is apparently maximized. Such locally high similarity measures will occur of necessity, irrespective of the above case, when the pattern matching is based on the combinations of all partial patterns of the input pattern and all the reference patterns. Using the equation (23) for the normalizing function, the equation (33) is normalized and we have:

$$R\{A_{(l,m)}, B^2\} = r[m - 1 + 1, J_2, S\{A_{(l,m)}, B^2\}] \quad (35)$$

$$= \frac{S\{A_{(l,m)}, B^2\}}{\{\alpha J_2 + \beta(m-l+1)\}\gamma}$$

$$= \frac{S\{A_{(l,k-1)}, B^2\}}{\{\alpha J_2 + \beta(m-l)\}\gamma} + \frac{S\{A_{(k,m)}, B^1\}}{\{\alpha J_2 + \beta(m-l)\}\gamma}$$

Normalizing the equation (31), we have:

$$R\{A_{(k,m)}, B^1\} = \frac{S\{A_{(k,m)}, B^1\}}{\{\alpha J_1 + \beta(m-k)\}\gamma} \quad (36)$$

To discuss the comparison of the magnitudes of $R\{A_{(l,m)},B^2\}$ in the equation (35) and $R\{A_{(k,m)},B^1\}$ in the equation (36), the former is divided by the latter. Using the equations (26) to (28) and $J_2=t+J_l$, we have:

$$\frac{R\{A_{(l,m)}, B^2\}}{R\{A_{(k,m)}, B^1\}} = \frac{S\{A_{(l,k-1)}, B^2\} + S\{A_{(k,m)}, B^1\}}{S\{A_{(k,m)}, B^1\}} \times \quad (37)$$

$$\frac{1}{\left\{1 + \frac{\alpha(J_2 - J_1) + \beta(k - l)}{\alpha J_1 + \beta(m - k + 1)}\right\}\gamma}$$

In the above equation, the first term is larger than "1", but the second term is smaller than "1". When the logically correct normalization is performed corresponding to the time duration of the partial pattern subjected to the matching, the registered word of n=1, which corresponds to "kyoto", tends to be selected, as in the previous case. If the constants $\alpha$, $\beta$, and $\gamma$ are appropriately selected, the right side can be set to be smaller than "1". For example, these constants are; $\alpha=5$, $\beta=1$, and $\gamma=1$.

As a result, the partial maximum similarity measure at time point i=m is $D_m = R\{A_{(l,m)}, B^2\}$, and the partial decision result is $W_m=2$. Therefore, the registered word n=2 corresponding to the word "tokyoto", which was presumed to be pronounced, can be specified. This indicates that the local similarity measurements between the partial pattern of the noise contained input pattern and the reference patterns, is eliminated, and the understandable voice as uttered in the noisy environment can be recognized correctly.

Figure 2:
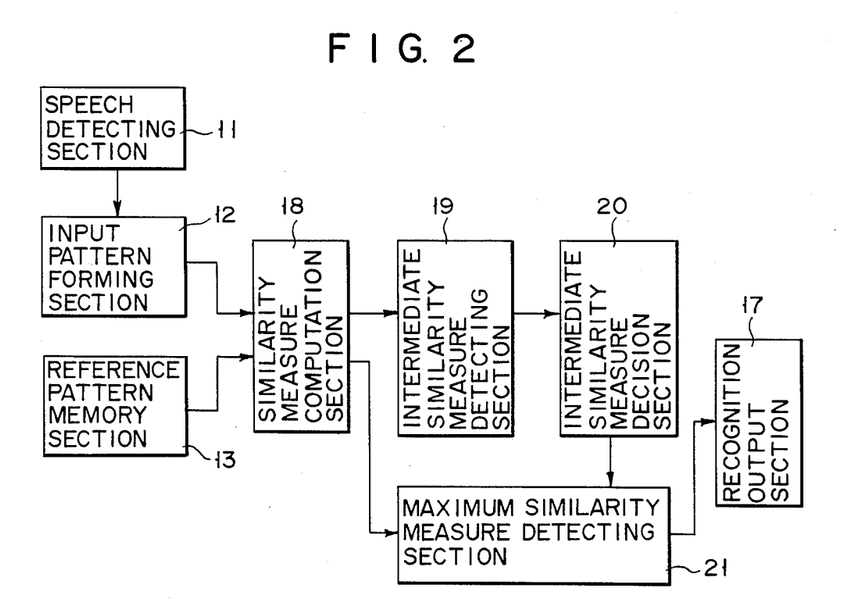
FIG. 2 is a block diagram illustrating a configuration of a speech recognition apparatus according to another embodiment of the present invention.

FIG. 2 shows in block form a second embodiment of the present invention. In this embodiment, a similarity measure $S\{A_{(p,q)},B^n\}$ is obtained, which is the sum of the vector similarity measures as defined for the time bases "i" and "j" of the partial patterns against the corresponding function j(i). The partial pattern for the time base "i" is obtained in input pattern forming section 12, and the partial pattern for the time base "j" is obtained in reference pattern memory section 13.

Intermediate similarity measure detecting section 19 obtains the sum of the weighting function for the time duration of the partial pattern $A_{(1,p-1)}$ of the input partial pattern, which is not subjected to the matching process, on the basis of the dynamic programming algorithm, and obtains the intermediate measure similarity measure corresponding to that results. Intermediate similarity measure decision section 20 successively executes the operation that the registered word "n" providing the intermediate similarity measure $D_q$ thus obtained is treated as the intermediate decision result, and obtains the intermediate similarity measure $D_i$ at every time point along the time series of the input pattern, and the intermediate decision result $W_i$.

Maximum similarity measure detecting section 21 obtains maximum similarity measure $D_{max}$ which is the largest normalized similarity measure of these measures as defined by the sum of the weight function corresponding to the time duration of the partial pattern $A_{(q+1, I)}$ of the input partial pattern, which is not subjected to the matching, and the intermediate similarity measure. Recognition output section 17 obtains the intermediate decision result $W_i$ providing the maximum similarity measure $D_{max}$, and outputs the registered word providing the $W_i$, as the recognition result.

Thus, in this embodiment, the called weighted part, which is for the time duration "t=I+p-q" of the partial pattern $A_{(1, p-1)}$, $A_{(q+1, I)}$ of the input pattern, which is not subjected to the matching, is applied to the similarity measure $S\{A_{(p,q)}, B^n\}$. With this, it is possible to compare the magnitudes of the similarity measures uniformly. This will be described in detail.

As recalled, the similarity measure as given by the equation (12) is that between the partial pattern $A_{(p,q)}$ as assumed to correspond to the understandable voice and the reference pattern $B_n$ for each "n". The similarity measure $S\{A_{(p, q)}, B^n\}$ as given by the equation (12) is obtained by using the following equations. With this, the local similarity measures are removed, so that the magnitudes of the similarity measures can be uniformly compared.

$$U\left\{A_{(p,q)}, B^n = U_p + \sum_{i=p}^{q} s(a_i, b_{j(i)}^n)\right\} \quad (38)$$

$$U_p = U_{(p)} \quad (39)$$

where U(p) is a function providing the weighting $U_p$ corresponding to the time duration $t=p-1$ of the partial pattern $A_{(1, P-1)}$ of the input pattern, which is not subjected to the matching. When the distance is used for the measure for the similarity measure, it is sufficiently larger than the vector average similarity when the matching is attained, but is sufficiently smaller than that when the matching is not attained. Actually, it is used as an initial value for computing the second term of the equation (38), and in the above case, $$U_p = S_o \cdot (p-1) \quad (40)$$

At this time, the equation (38) is rewritten into:

$$U\{A_{(p,q)}, B^n\} = s_o \cdot (p - 1) + \sum_{i=p}^{q} s\{a_i, b_j^n(i)\} \quad (41)$$

The similarity measure $U\{A_{(p, q)}, B^n\}$ thus obtained can be subjected to the magnitude comparison, irrespective of the time duration $T=g-p+1$ of the partial pattern $A_{(p, q)}$ of the input pattern as subjected to the matching. Therefore, the partial similarity measure as given by the equation (13) can be obtained by:

$$S_q{}^n = {}_p{}^{max} U\{A_{(p,q)}, B^n\} \tag{42}$$

The partial maximum similarity measure as obtained by maximizing it for "n" is:

$$\begin{aligned} D_q &= \overset{max}{n} \{S_q{}^n\} \\ &= \overset{max}{n}\left[\overset{max}{p}\ U\{A_{(p,q)}, B^n\}\right] \\ &= \overset{max}{p,n}[U_p + S\{A_{(p,q)}, B^n\}] \end{aligned}$$

The partial maximum similarity measure $D_q$ thus obtained determines the registered word $W_q$ providing the reference pattern $B^n$ which optimumly approximates the partial pattern $A_{(1, m)}$ corresponding to the meaning voice when time point $i=q$ is assumed to be the endpoint.

By repeating the above sequence of operations over $q=1$ to I, the partial maximum measure $D_i$ of the input pattern at each time point "i", and the partial decision result $W_i$ can be obtained. The partial maximum similarity measures $D_i$ obtained here can not be subjected to the magnitude comparison, because the time point "i" which is assumed to be the endpoint of the partial pattern $A_{(1, m)}$ corresponding to the meaning voice, differs.

To make it possible to compare the magnitudes of the partial maximum similarity measures $D_i$, it is necessary to appropriately set the function $U_{(q)}$ providing the weighting $U_p$ for the time duration $q=I-i$ from the time point "i" to the time point "I" at the termination of the input pattern, and to apply it to the partial similarity measured at each time point "i". Therefore, the maximum similarity measure between the reference pattern $B^n$ optimumly approximating the partial pattern $A_{(1, m)}$ of the input pattern, which corresponds to the understandable voice, and the input pattern as well can be given by:

$$\begin{aligned} D_{max} &= \overset{max}{q}\ [D_q + U_q] \\ &= \overset{max}{p,q,n}[U_p + S\{A_{(p,q)}, B^n\} + U_q] \end{aligned} \tag{44}$$

Thus, he registered word providing the maximum similarity measure as given by the equation (44) is the recognized word.

As described above, one of the features of the present invention resides in that, by optimumly determining the function providing the similarity measure between the reference pattern $B^n$ and the partial pattern $A_{(p, q)}$ of the input pattern, which is independent of the time dduration of the input pattern $A_{(p, q)}$ as subjected to the matching and expressed by the function $r\{q-p+1, J_n, A(p,q), U(p), U(q)\}$ and the time duration $J_n$ of reference pattern $B_n$, the results of calculation based on the dynamic programming algorithm with the called starting point free, and endpoint free, are uniformly compared.

Therefore, the reference pattern optimumly approximating the partial pattern $A_{(1, m)}$ corresponding to the meaning voice, which is contained in the noise-contained input pattern and can not be recognized, can be stably be recognized, and therefore the related recognized word is obtained.

The equation (18) can be processed by the typical dynamic programming algorithm in the starting point $i=p$ is free, the initial value at the starting point is "0", and the endpoint is fixed.

This will be described referring to FIG. 3. The sum of products of a path to maximize the sum of the vector similarity measures $S_n(i,j)$ of the feature vectors $a_i$ and $b_j{}^n$ at a grid point $(i, j)$ of a path from $(p,1)$ of the starting point to endpoint $(q, J_n)$, with $s_o=0$ for the initial value, is obtained, by the DP algorithm, as $S\{A_{(p,q)}, B^n\}$.

It has been known that the time bases of the actual input pattern and the reference pattern are never deviated by 50% or more. Therefore, if the path in the vicinity of a straight line $i=j$ is selected, it is possible to maximize the relation (18). Accordingly, a plane $(i-j)$ for computing the vector similarity measure $S_n(i,j)$ can be limited to some extent. This limitation can be realized by a called adjustment window arranging the regions with fixed width on both sides of the straight line $i=j$. This is not necessarily an appropriate approach in the respects of the of computation and the memory capacity of the working memory. In this instance, the recursive relation containing the two-side slope constraint is used for that of the DP algorithm.

There are various recursive relations containing the slope constraint. In this instance, the following specific recursive relation is solved for $j=i$ to $J_n$ and $i=1-I$, with an appropriate initial value:

$$g_{(i,j)} = s_{(i,j)} + \max\ \begin{array}{l} g_{(i-2,j-1)} + s_{(i-1,j)} \\ g_{(i-1,j-1)} \\ g_{(i-1,j-2)} \end{array} \tag{45}$$

Figure 4A:
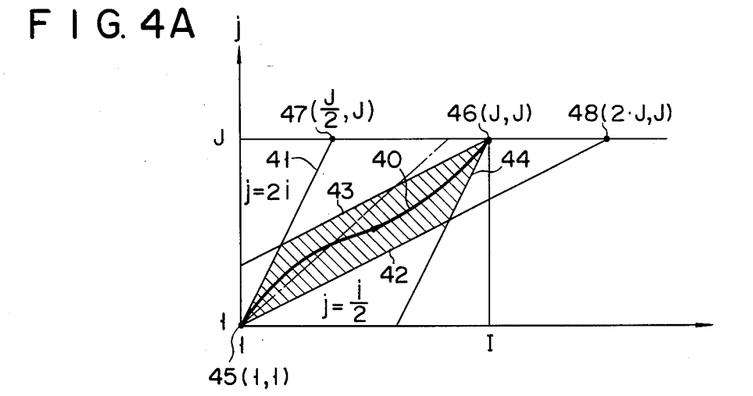
FIG. 4A shows a graph for explaining a computing range by a recursive relation with slope constraint when the starting and endpoints are fixed.
Figure 4B:
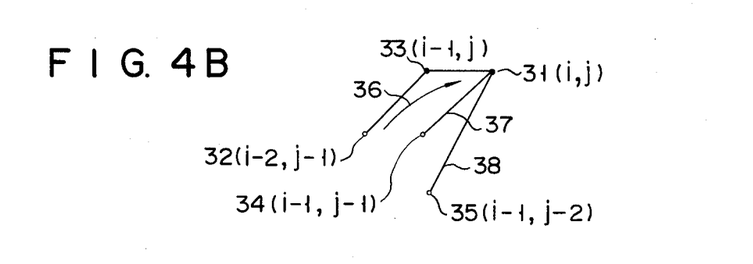
FIG. 4B shows a vector diagram for explaining the slope of that recursive relation.

As shown in FIG. 4B, there are three paths from different starting points to point 31 $(i, j)$; a path 36 from point 32 $(i-2, j-1)$ to point 31$(i, j)$ via point 33 $(i-1, j)$; a path 37 from point 34 $(i-1, j-1)$ to point 31 $(i, j)$; and a path 38 from point 35 $(i, j-2)$ to the same point $(i, j)$. Among these three paths, the longest path is selected.

Figure 3:
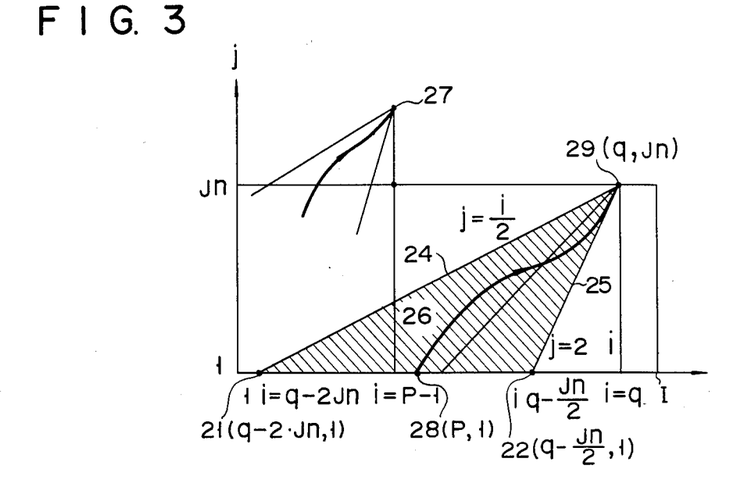
FIG. 3 shows a graph for explaining a similarity measure by the dynamic programming algorithm.

A computing range by the relation (45) in the $(i-j)$ plane is illustrated in FIG. 3. As shown, since endpoint 29 is fixed as $(q, J_n)$, to reach this endpoint, the vector similarity measure $S_n(i, j)$ is computed in a hatched region between line 24 with a slope of ½ and line 25 with a slope of 2, and an optimal path is found by using recursive relation (45).

All the points $28_{(p,1)}$ from point 21 $(q-2.J_n, 1)$ to point 22 $(q-J_n/2, 1)$ are candidates for the starting point. The final result $g_n(q, J_n)$ of the recursive relation indicates:

$$g_n(q, J_n) = {}_p{}^{max} [S\{A_{p,q}, B^n\}] \tag{46}$$

The recursive relation is solved for $j=1$ to $J_n$ by increasing "i" to "q" in unitary increments. In this case, candidates for the starting point are all the points of the input pattern.

Figure 5:
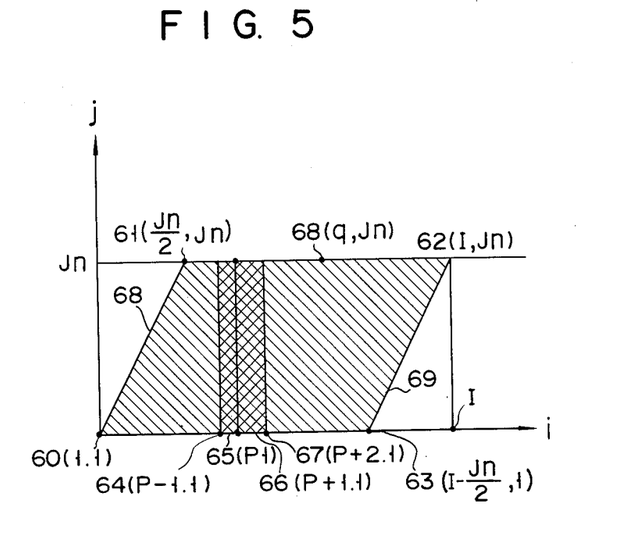
FIG. 5 shows a graph for explaining a computing range by the recursive relation.

Therefore, the maximizing of the relation (18) is performed for each time point $i=q$ of the input pattern. Since actually, the recursive relation itself contains a slope constraint, the dynamic programming algorithm is constructed such that in FIG. 5, all the points 65 (p,1), ($1 \leq p \leq I - J_n/2$) from point 60 (1, 1) to point 63 ($i - J_n/2$, 1) are candidates for the starting points, while all the points 68 (q, $J_n$), ($J_n/2 \leq q \leq I$) from point 61 ($J_n/2$, $J_n$) to point 62 (I, $J_n$) are candidates for the endpoint.

Figure 6:
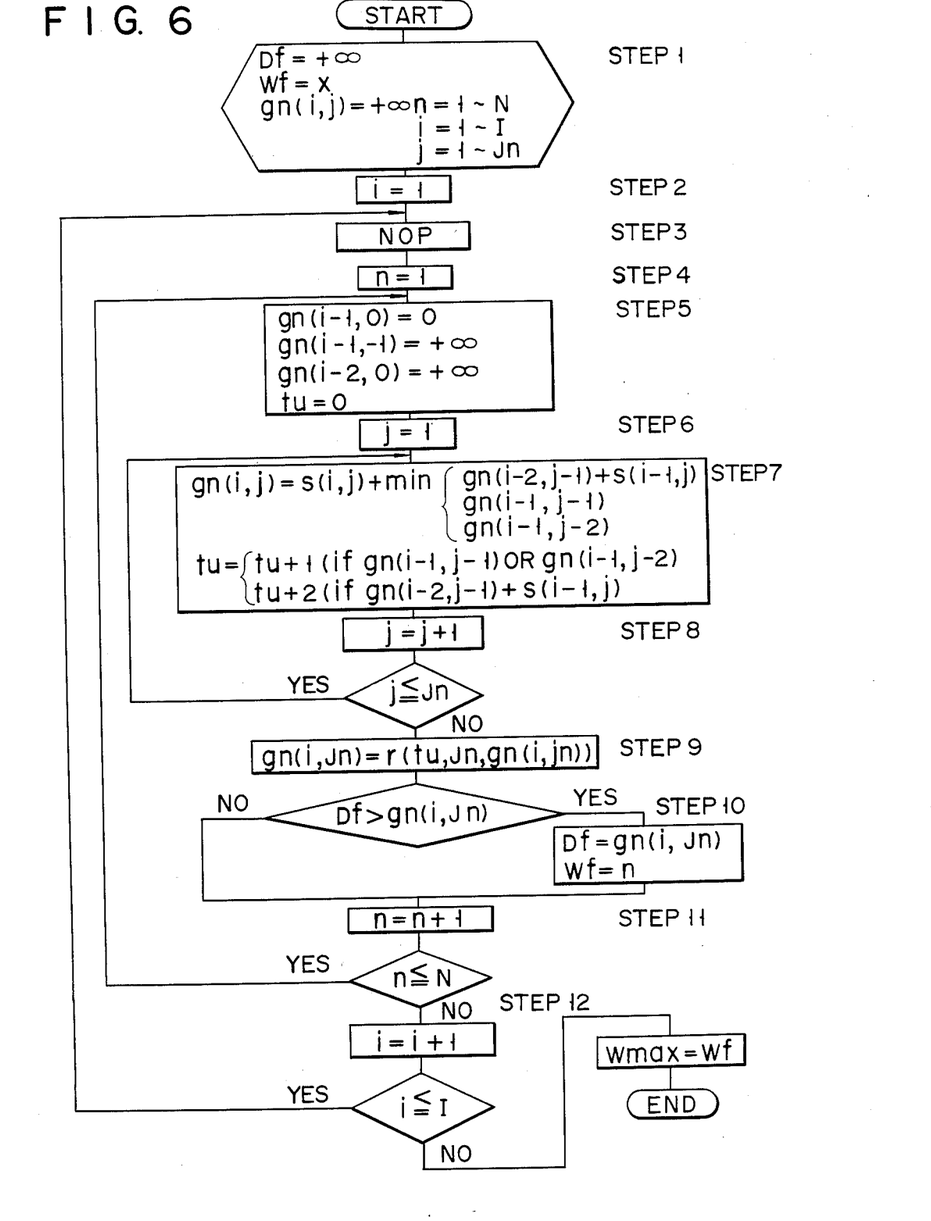
FIGS. 6 and 7 show flowcharts useful in explaining the flow of operation of each embodiment.

The detailed operating flow in the embodiment shown in FIG. 1 which uses the dynamic programming algorithm, will be described with reference to a flowchart of FIG. 6. In this case, distance is used for expressing the similarity measure.

Step 1 initializes the partial maximum similarity measure $D_i$, the partial decision result $W_i$ and the intermediate result of the recursive relation 45.

Step 2 initializes a variable "i" for the time base of an input pattern.

Step 3 does not perform any processings in particular.

Step 4 initializes a variable "n" for a registered word number.

Step 5 sets the initial values of the recursive relation (45) as:

$$g_n(i-1, 0) = 0$$

$$g_n(i-1, 0) = +\infty.$$

$$g_n(i-2, 0) = +\infty.$$

$+\infty$ indicates a positive maximum value that a computer can realize, so that when compared with another value, $+\infty$ will always increase.

Step 6 initializes a variable "j" for the time base of a reference pattern.

Steps 7 and 8 changes a variable "j" on the time base of the reference pattern in the range of "j=1 to $J_n$, to compute sequentially recursive relation (45). At the same time, these steps compute the time duration $t_n$ of a partial pattern subjected to the matching used for normalizing the similarity measure:

$$t_n = t_n + 1 \text{ (for example, } g_{n(i-1,j-1)}, g_{n(i-1,j-2)}) \quad (47)$$
$$= t_n + 2 \text{ (for example, } g_{n(i-2,j-1)} + s_{(i-1,j)}).$$

In computing g(i, j), the upper expression "$t_n = t_n + 1$" of (47) is used when $g_n(i-1, j-1)$ or $g_n(i-1, j-2)$ is selected as a second term of the expression (45), and $t_n = t_n + 2$" of (47) is used when $g_{n(i-2, j-1)} + s_{(i-1, j)}$ is selected.

Step 9 normalizes a similarity measure between it and a registered word "n at time point i". By this normalization, the computed similarity measure can be compared with one another in magnitude.

Step 10 compares the similarity measure normalized in step 9 with the maximum similarity measure Df at the time point earlier than the time point "I−1". If $D_f > g_{n(i, Jn)}$, then the maximum similarity measure $D_f$ and the decision result $W_f$ are updated.

Step 11 updates "n" to "n=n+1", and if $n \leq N$, returns flow to step 5, where matching with another reference pattern is performed.

Step 12 updates "i" to "i=i+1", and if $i \leq I$, returns flow to step 3, where a recursive relation of the input pattern at the next time point is computed.

If the operation is advanced according to the above flow, $D_f$ and $W_f$ always hold respectively a maximum similarity measure at the time point earlier than time point "i" and a registered word "n" that gives that maximum similarity measure. Accordingly, after the completion of the operation according to the flowchart of FIG. 6, $D_f$ and $W_f$ respectively hold the maximum similarity measure $D_{max}$ as Df and the registered word as Wf that gives $D_{max}$. It is decided that the word to be recognized is $W_f$.

Figure 7:
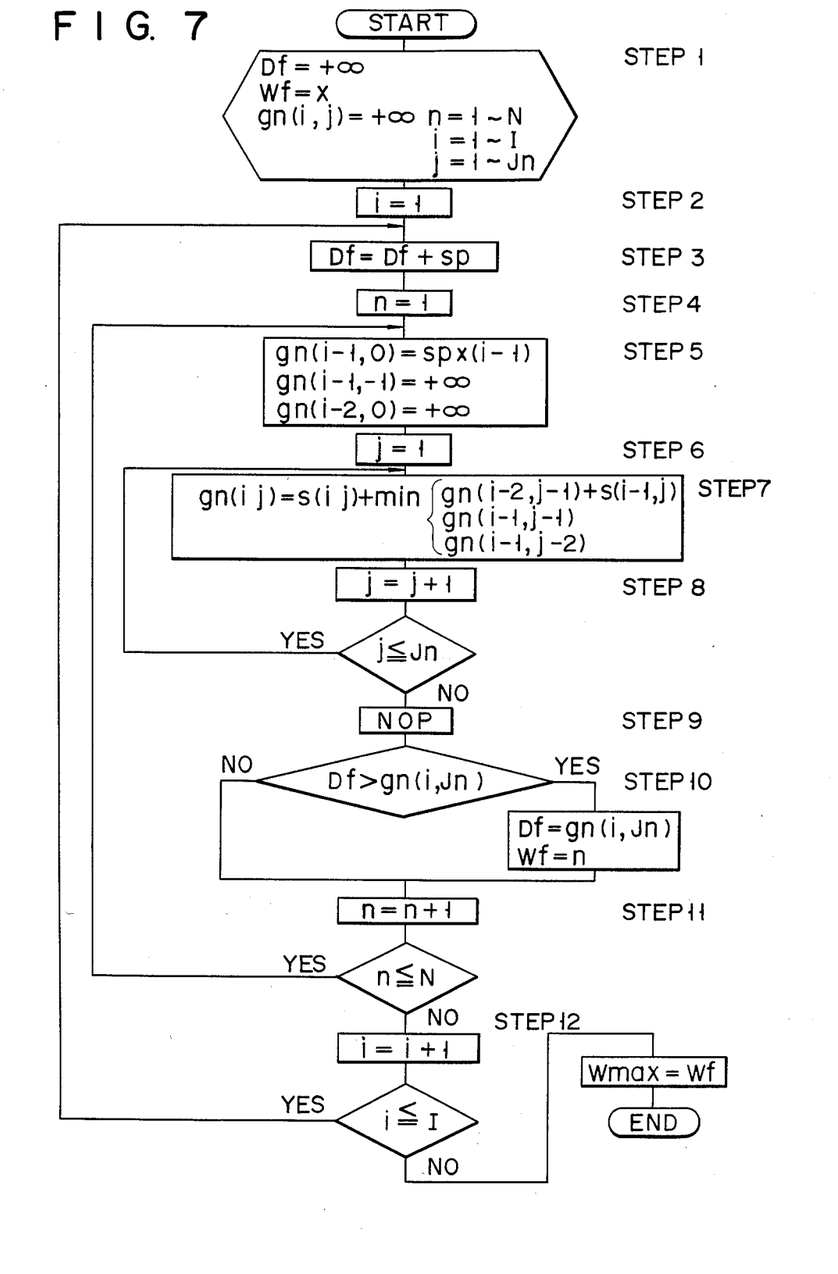

The flow of operation in the embodiment shown in FIG. 2 is as shown in the flowchart of FIG. 7. The flow is essentially the same as in the former embodiment of FIG. 6. The difference between these flows will be given below. In step 3 of FIG. 7, the intermediate maximum similarity measure is defined as:

$$D_f = D_f + s_p \quad (48)$$

This indicates that the weighting for the time duration between the endpoint of the partial pattern subjected to the matching and the time point "i" of the input pattern, is applied to the maximum similarity measure $D_f$ in the range of time till time point "i−1". If this operation is repeated up to the time point "I", as the endpoint of the input pattern, the weighting defined as:

$$U_p = s_p \times (I - q) \quad (49)$$

is applied to the intermediate similarity measure at time point "i". "$s_p$" is a predetermined constant, which is sufficiently larger than the average vector similarity measure $\bar{s}$ when matching is met, and smaller than the vector similarity measure when matching is not met. For example, $s_p$ is given:

$$s_p = 2 \times \bar{s} \quad (49)$$

In step 5, the initial values for the recursive relation (45) are given:

$$g_{n(i-1, 0)} = (i-1) \times s_p$$

$$g_{n(i-1, -1)} = +\infty$$

$$g_{n(i-2, 0)} = +\infty \quad (50)$$

$g_{n(i-1, 0)} = (i-1) \times s_p$ gives the weighting for the time duration "p" between the starting point of the input pattern and the starting point of the partial pattern subjected to the matching.

Accordingly, this is equivalent to the definition of the weight function of the relation (44), which was made in steps 3 and 5, as:

$$U_p = s_p \times (p-1)$$

$$U_q = s_p \times (I-q)$$

Step 7 computes the recursive relation (45). However, in this embodiment, there is no need for knowing the time duration of the partial pattern used for the matching, and therefore, computation of $t_n$ is unnecessary. The normalization of the similarity measure was done in steps 3 and 5. Therefore, step 9 does not have any operation.

In the above description, steps with no operation have been mentioned. This is for the purpose of making clear the operations in this embodiment. Therefore, in the description of the embodiment, the steps with no operation have no significance, and may be ignored.

Some points have been described limited departing from the embodiment for simplicity of explanation. It is noted, however, that the description of these is not intended to limit the scope of this invention. Especially, there are various similarity measures between vectors, as mentioned earlier. Any one of them may be used. That a similarity measure between a partial pattern of the input pattern subjected to the matching and the reference pattern is maximum means that, in the case of the inner product as the measure for the vector similarity measure, which increases as the similarity becomes higher, the sum of the products is at the maximum, and in the case of the distance as the measure for the vector similarity measure, which decrease as the similarity becomes higher, the sum of the products is at the minimum. Therefore, in the latter case, the maximization of the similarity measure described thus far means the minimization of the sum of products of the vector similarity measures and that of the normalized similarity measure.

What is claimed is:

1. A speech recognition apparatus comprising:

partial pattern forming means for obtaining a partial pattern $A_{(p,q)}=a_p, a_{p+1}, \ldots, a_q$ (where $1 \leq p \leq q \leq I$) whose starting point is time point $i=p$ in an input pattern $A=a_1, a_2, \ldots, a_i, \ldots, a_I$, which is expressed in the time series of feature vectors, and whose endpoint is time point $i=q$;

reference pattern memory means for storing the reference patterns $B^n$ for each word number "n" of a reference pattern $B^n=b_1^n, b_2^n, \ldots, b_j^n, \ldots, b_{jn}^n$, which is previously set for each word number "n";

normalized similarity measure computing means in which a function j(i) is set up which makes the time base "i" of the partial pattern obtained by said partial pattern forming means correspond to the time base "j" of the reference pattern stored by said reference pattern memory means, and a maximum similarity measure $S\{A_{(p,q)}, B^n\}$ as a maximum value of the sum of the vector similarity measure s $\{a_i, b^n, j(i)\}$ as defined by said time base "i" and said function j(i) is obtained as a normalized similarity measure as defined by a normalizing function r[q-p+1, Jn, $S\{A_{(p,q)}, B^n\}$] which provides a normalized similarity measure not dependent on the time duration $t=q-p+1$ of said partial pattern and the time duration of said reference pattern;

partial maximum similarity computing means for maximizing for each "p" the normalized similarity measure obtained by said normalized similarity measure computing means by using the dynamic programming algorithm, and for obtaining a maximum value of the result of said maximization for "n", as a partial maximum similarity measure;

$$D_q = R\{A_{(p,q)}, B^{wg}\}$$
$$= \overset{max}{n} [R\{A_{(p,q)}, B^n\}]$$

partial decision means for successively repeating the operation that the registered word "n" providing the partial maximum similarity measure $D_q$ obtained in said partial maximum similarity computinq means is treated as a partial decision result $W_q$, in the range of $q=1$ to I, and for obtaining the partial similarity measure $D_i$ and the partial decision result $W_i$ ($i=1$ to I) at all the time points along the time series of the input pattern; and output means in which the largest partial maximum similarity measure of those measures obtained in said partial decision means, is treated as a maximum similarity measure $D_{max} = {}_i^{max}\{D_i\}$ (where $i=1$ to I), and the partial decision result $W_i$ providing that maximum similarity measure $D_{max}$ is obtained, and said result is output as the recognition result.

2. An apparatus according to claim 1, in which said normalizing function for providing a normalized similarity measure in said normalized similarity measure computing means is given as an average similarity measure for each unit time, and mathematically expressed by:

$$r[q - p + 1, J_n, S\{A_{(p,q)}, B^n\}] = \frac{S\{A_{(p,q)}, B^n\}}{q - p + 1 + J_n}$$

3. An apparatus according to claim 1, in which said normalizing function for providing a normalized similarity measure in said normalized similarity measure computing means is given as an average similarity measure for each unitary path length in the pattern matching, and mathematically expressed by:

$$r[q - p + 1, J_n, S\{A_{(q,p)}, B^n\}] = \frac{S\{A_{(p,q)}, B^n\}}{p^{ass}}$$

where $p^{ass}$ = matching path length.

4. An apparatus according to claim 1, in which said normalizing function for providing a normalized similarity measure in said normalized similarity measure computing means is given by:

$$r[q - p + 1, J_n, S\{A_{(p,q)}, B^n\}] = \frac{S\{A_{(p,q)}, B^n\}}{\{\alpha \cdot J_n + \beta \cdot (q - p + 1)\}\gamma}$$

where $\alpha$, $\beta$, and $\gamma$ are constants.

5. A speech recognition apparatus comprising: input pattern forming means for obtaining a partial pattern $A_{(p,q)}=a_p, a_{p+1}, \ldots, a_q$ (where $1 \leq p < q \leq I$) whose starting point is time point $i=p$ in an input pattern $A=a_1, a_2, \ldots, a_i, \ldots, a_I$, which is expressed in the time series of feature vectors, and whose endpoint is time point $i=q$;

reference pattern memory means for storing the reference patterns $B^n$ for each word number "n" of a reference pattern $B^n=b_1^n, b_2^n, \ldots, b_j^n, \ldots b_{jn}^n$, which is previously set for each word number "n";

similarity measure computing means in which a function j(i) is set up which makes the time base "i" of the partial pattern obtained by said input pattern forming means correspond to the time base "j" of the reference pattern stored by said reference pattern memory means, and a maximum similarity measure $S\{A_{(p,q)}, B^n\}$ of the sum of the vector similarity measure s $\{a_i, b^n_{j(i)}\}$ as defined by said time base "i" and said function j(i) is obtained;

first intermediate similarity measure computing means for obtaining said obtained similarity measure $S\{A_{(p,q)}, B^n\}$, as a maximum similarity measure, as mathematically given below, of the maximum results for "n" as given by maximizing, by using the dynamic programming algorithm, for "p" at time point $i=q$, the sum of the weighting function $U_p=0$ (where $p=1$) and $U_p=U_{(p)}$ (where $1 \leq p \leq I$) for the time duration p-1 of the partial pattern $A_{(1, p-1)} = a_1, a_2, \ldots, a_i, \ldots, a_{p-1}$ whose starting point is time point i=1 of the input pattern and the endpoint is time point i=p-1

$$D_q = \max_{pn} S\{A(p,q), B_q\} = [U_p + S\{(p,q), B^n\}]$$

means for successively repeating the operation that the registered word "n" providing the intermediate similarity measure $D_q$ obtained in said first intermediate similarity computing means is treated as an intermediate decision result $W_q$, in the range of q=1 to I, and for obtaining the intermediate similarity measure $D_i$ and the intermediate decision result $W_i$ (i=1 to I) at all the time points along the time series of the input pattern;

maximum similarity computing means for obtaining said intermediate similarity measure $D_i$ as a maximum similarity measure which is given below and the largest normalized similarity measure of those measure $R_q = D_q + U_q$ (where q=1 to I) as defined by the weighting function $U_q=0$ (where q=I) and $U_q = U_{(I-q)}$ (where $1<q<I$) for the time duration "I−q" of the partial pattern:

$$A_{(q+1, I)} = a_{q+1}, a_{q+2}, \ldots, a_i, \ldots, a_I$$

of an input pattern whose starting point is said time point i=q+1 and the endpoint is time point i=I; and output means for obtaining the intermediate result $W_i$ giving said maximum similarity measure $D_{max}$ and outputting a registered word giving said $W_i$ as the recognition result.

* * * * *

UNITED STATES PATENT AND TRADEMARK OFFICE
CERTIFICATE OF CORRECTION

PATENT NO. : 4,783,806

DATED : November 8, 1988

INVENTOR(S) : NAKAMURA et al.

It is certified that error appears in the above-identified patent and that said Letters Patent is hereby corrected as shown below:

ON THE FIRST INFORMATION PAGE:

Reads: "[75] Inventors: Kazuo Nakamura, Kariya, Tadao Norjiri, Oobu, both of Japan"

Should Read: --[75] Inventors: Kazuo Nakamura, Kariya; Tadao Nojiri, Oobu, both of Japan--

Signed and Sealed this

Twenty-first Day of March, 1989

Attest:

DONALD J. QUIGG

Attesting Officer

Commissioner of Patents and Trademarks